US012134366B2

(12) United States Patent
Blum (10) Patent No.: US 12,134,366 B2
(45) Date of Patent: Nov. 5, 2024

(54) PASSIVE RESTRAINT TECHNIQUES FOR AMUSEMENT PARK RIDES (71) Applicant: Universal City Studios, LLC, Universal City, CA (US)

(72) Inventor: Steven C. Blum, Orlando, FL (US)

(73) Assignee: Universal City Studios LLC, Universal City, CA (US)

(*) Notice: Subject to any disclaimer, the term of this patent is extended or adjusted under 35 U.S.C. 154(b) by 1086 days.

(21) Appl. No.: 16/221,134

(22) Filed: Dec. 14, 2018

(65) Prior Publication Data
US 2019/0184935 A1 Jun. 20, 2019

Related U.S. Application Data (60) Provisional application No. 62/607,770, filed on Dec. 19, 2017.

(51) Int. Cl.
B60R 22/00 (2006.01)
A63G 7/00 (2006.01)
B60R 21/02 (2006.01)
B60R 22/48 (2006.01)
B60R 21/00 (2006.01)

(52) U.S. Cl.
CPC ............ B60R 22/48 (2013.01); A63G 7/00 (2013.01); B60R 21/02 (2013.01); B60R 2021/0097 (2013.01); B60R 2021/022 (2013.01); B60R 2022/4816 (2013.01); B60R 2022/4866 (2013.01)

(58) Field of Classification Search
CPC . B60R 22/48; B60R 21/02; B60R 2021/0097; B60R 2021/022; B60R 2022/4816; B60R 2022/4866; A63G 7/00
See application file for complete search history.

(56) References Cited

U.S. PATENT DOCUMENTS

| 5,015,933 | A | * | 5/1991 | Watkins | .................... | G09B 9/14 |
| | | | | | | 472/60 |
| 5,182,836 | A | | 2/1993 | Burkat | | |
| 5,489,212 | A | | 2/1996 | Masao et al. | | |
| 5,529,382 | A | * | 6/1996 | Burkat | .................... | B60R 21/02 |
| | | | | | | 297/487 |
| 7,564,360 | B2 | | 7/2009 | Cote et al. | | |
| 7,758,435 | B2 | | 7/2010 | Henry et al. | | |
| 8,453,576 | B2 | | 6/2013 | Roodenburg et al. | | |

(Continued)

FOREIGN PATENT DOCUMENTS

| CN | 106462735 A |  | 2/2017 |  |  |
| GB | 2527757 A | * | 1/2016 | ........... | B60R 22/185 |

(Continued)

OTHER PUBLICATIONS

PCT/US2018/066079 Invitation to Pay Fees dated Feb. 27, 2019.

(Continued)

Primary Examiner — Adam M Alharbi
(74) Attorney, Agent, or Firm — Fletcher Yoder, PC (57) ABSTRACT A system includes a ride vehicle of an amusement park ride and a restraint system coupled to the ride vehicle and including a lock having a detector that may receive a wireless signal. Receiving the wireless signal causes the lock to lock or unlock and the restraint system may secure a rider within the ride vehicle.

20 Claims, 4 Drawing Sheets

(56) References Cited

U.S. PATENT DOCUMENTS

| | | | |
|---|---|---|---|
| 9,192,865 B2 | 11/2015 | King et al. | |
| 9,600,999 B2 | 3/2017 | Stenzler | |
| 2003/0160497 A1 | 8/2003 | Darr | |
| 2004/0246100 A1* | 12/2004 | Kranz | G06K 19/0717 340/10.1 |
| 2008/0150345 A1* | 6/2008 | Blum | B60R 21/02 297/487 |
| 2008/0246327 A1* | 10/2008 | Collins | B60R 22/02 297/476 |
| 2009/0031541 A1 | 2/2009 | Pribonic | |
| 2009/0177357 A1* | 7/2009 | Long | B60R 22/48 701/45 |
| 2013/0341993 A1 | 12/2013 | Kennington et al. | |
| 2017/0036764 A1* | 2/2017 | Goyal | B64D 11/0015 |
| 2018/0061157 A1* | 3/2018 | Zielkowski | A45F 5/02 |

FOREIGN PATENT DOCUMENTS

| | | | |
|---|---|---|---|
| JP | 2000296734 A | | 10/2000 |
| JP | 2005520733 A | | 7/2005 |
| JP | 2006000665 A | | 1/2006 |
| JP | 2011529721 A | | 12/2011 |
| JP | 2012116387 A | | 6/2012 |
| JP | 2016016816 A | | 2/2016 |
| KR | 20100022029 A | | 2/2010 |
| KR | 20130063791 A | | 6/2013 |
| KR | 102389633 B1 | * | 5/2015 |
| RU | 84247 U1 | | 7/2009 |
| WO | 2010009482 A2 | | 1/2010 |

OTHER PUBLICATIONS

CN 201880079947.2 Office Action mailed Aug. 10, 2021.
RU 2020123609 Office Action mailed Feb. 4, 2022.
IN 202017023524 Office Action mailed Mar. 28, 2022.
JP Office Action for Japanese Application No. 2020-533215 mailed Nov. 14, 2022.
KR Office Action for Korean Application No. 2020-7020943 mailed Nov. 19, 2023.

* cited by examiner

PASSIVE RESTRAINT TECHNIQUES FOR AMUSEMENT PARK RIDES

CROSS REFERENCE TO RELATED APPLICATIONS

This application claims the benefit of U.S. Provisional Application No. 62/607,770, entitled "PASSIVE RESTRAINT TECHNIQUES FOR AMUSEMENT PARK RIDES," filed Dec. 19, 2017, which is hereby incorporated by reference in its entirety for all purposes.

BACKGROUND

The present disclosure relates generally to the field of amusement parks. More specifically, embodiments of the present disclosure relate to systems and methods for securing guests inside a ride vehicle of an amusement park ride.

Various amusement park rides have been created to provide riders with unique motion and visual experiences. For example, theme rides can be implemented with single-rider or multi-rider vehicles that travel along a path or that utilize a motion base. Excitement is often created by the speed or change in direction of the vehicles as they move along a ride path or follow a motion routine. For example, the ride path may include a number of features such as, but not limited to, tunnels, turns, ups, downs, loops, and so forth. While the riders are inside the operating ride, they may be subject to forces while the ride is in operation. Accordingly, it may be desirable to restrain and secure riders within the ride vehicle for the duration of the amusement park ride.

BRIEF DESCRIPTION

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a system includes a ride vehicle of an amusement park ride and a restraint system coupled to the ride vehicle and including a lock having a detector that may receive a wireless signal. Receiving the wireless signal causes the lock to lock or unlock and the restraint system may secure a rider within the ride vehicle.

In accordance with a second embodiment, a system includes a restraint system coupled to a ride vehicle of an amusement park ride and that may secure a rider within a ride vehicle. The restraint system includes a first strap having a first connector, a second strap having a second connector, a third strap having a lock that may removably couple to the first connector and the second connector, and a detector that may receive a wireless signal. Receiving the wireless signal causes the lock to transition between a locked configuration and an unlocked configuration, the first connector and the second connector are at least partially retained within the lock in the locked configuration and are removable from the lock in the unlocked configuration.

In accordance with the third embodiment, a system includes a ride vehicle of an amusement park ride and a restraint system coupled to the ride vehicle. The restraint system includes a restraining bar having a pivoting arm that may move from a restrained configuration to an unrestrained configuration and a detector that may receive a wireless signal. Receiving the wireless signal causes the pivoting arm to lock or unlock, the pivoting arm is capable of pivoting when unlocked to transition from the restrained configuration to the unrestrained configuration and the pivoting arm is fixed in the restrained configuration when locked.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments of the disclosure are directed to systems and methods for securing a rider inside a ride vehicle of an amusement park ride using passive restraint systems that do not use power to actuate a locking mechanism. For example, the disclosed systems and methods include a passive restraint system (e.g., seat belt, harness, restraint bar (e.g., lap bar, shoulder bar), and the like) that includes a locking mechanism that is activated and deactivated wirelessly (e.g., via electromagnetic signals). The locking mechanism may be activated at any time after loading and prior to the start of the amusement park ride to secure the rider within the ride vehicle throughout the duration of the amusement park ride. The disclosed locking mechanism may be inaccessible to the rider such that the rider may be unable to prematurely unlock the locking mechanism during operation of the ride. Once the amusement park ride ends, the locking mechanism may be deactivated, for example at an unlocking point at an unloading station, to release the rider from the ride vehicle.

The disclosed techniques do not use active power to maintain the locked configuration and, therefore, are capable of locking and unlocking without active power to the ride vehicle. That is, the passive restraint systems will not unlock when the power being supplied is cut off. This is in contrast to active restraint systems that stay locked while receiving power but that unlock when the power is cut off. Certain existing ride restraints for securing riders within the ride vehicle use a power source implemented into the ride vehicle to lock and unlock the restraint. Power-operated or active ride restraint systems may ensure that the rider is restrained throughout the duration of the amusement park ride and while the restraint mechanism is receiving power from an active power source. The power is then cut off to the restraint after completion of the amusement park ride to allow the rider to exit the ride vehicle. However, power operated active restraint systems may be difficult to integrate into certain amusement park rides. For example, certain existing amusement park ride systems may not include a power source that may be used to actuate the power operated restraint system. Additionally, it may be difficult and/or costly to integrate a power source for the ride restraints into existing and/or new amusement park rides due, in part, to ride design and configurations. Therefore, by using wireless activation to control the locking mechanism, the disclosed restraint system may be retro-fitted into existing ride vehicles that are not equipped with power sources.

Figure 1:
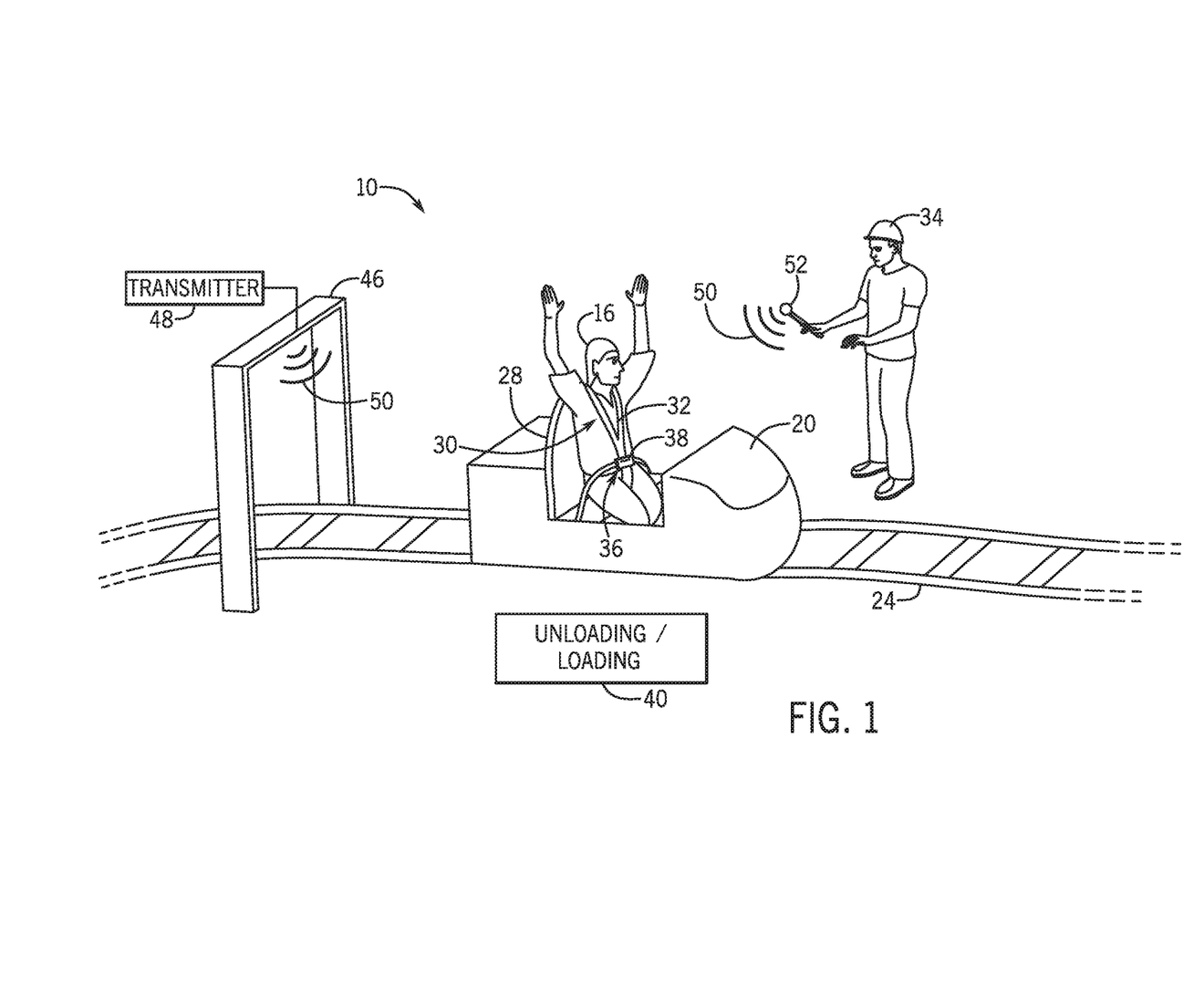
FIG. 1 is a schematic representation of an amusement park ride, whereby the amusement park ride includes a ride vehicle having a passive restraint system, in accordance with an embodiment of the present disclosure.

FIG. 1 illustrates an embodiment of an amusement park ride 10 that uses a passive restraint system having a wireless locking mechanism to secure a rider 16 during operation of the amusement park ride 10. In the illustrated embodiment, the amusement park ride 10 includes a ride vehicle 20 that travels along a track 24 defining a ride path of the amusement park ride 10. The ride vehicle 20 includes a ride seat 28 that supports the rider 16 within the ride vehicle 20 and a restraint system 30 that secures the rider 16 within the ride seat 28 during operation of the amusement park ride 10. In the illustrated embodiment, the restraint system 30 includes a 5-point harness 32. However, in other embodiments, the restraint system 30 includes a seat belt (e.g., lap belt), a restraint bar (see, e.g., FIGS. 5 and 6), or any other suitable restraining mechanism.

As discussed in further detail below, the restraint system 30 includes a locking mechanism 36 having a lock 38 (e.g., a buckle, a clip, a lock, a fastener, and the like) that may be actuated wirelessly (e.g., via radio frequency or any other suitable electromagnetic signal). For example, the locking mechanism 36 may be actuated at a loading/unloading station 40 to lock or unlock the locking mechanism 36 and secure or release, respectively, the rider 16 within the ride seat 28. The loading station may include a lock point where the locking mechanism is actuated (e.g., automatically or by the crew member 34) to secure the rider 16 in the ride vehicle 20. In certain embodiments, the loading station may also include a control point where the crew member 34 may verify that the rider 16 is properly restrained within the ride seat 28. Similarly, the unloading station may include an unlock point where the locking mechanism is deactivated to unlock and release the rider from the ride vehicle 20.

As used herein, the "loading station" is intended to denote an area where the rider 16 boards a ride vehicle of the amusement park ride. The "unloading station" as used herein is intended to denote an area where the rider 16 exits a ride vehicle. In certain embodiments, the loading and unloading stations are located in different areas of the amusement park ride 10. In other embodiments, the loading and unloading stations are located in the same area of the amusement park ride 10. The "control point" as used herein is intended to denote a location where verification that the rider 16 is properly secured within the ride vehicle 20 takes place. The "lock point" as used herein is intended to denote the point at which the locking mechanism of the restraint system 30 is locked and unable to be unlocked. A "lock point" may refer to a location (e.g., the locking mechanism is locked beyond a certain physical location), a time point (e.g., the locking mechanism is locked after a particular time), or an event point (e.g., the locking mechanism is locked before a particular event, such as a vehicle movement start). The "unlock point" as used herein is intended to denote the point at which the locking mechanism of the restraint system 30 is unlocked.

As discussed previously, the locking mechanism 36 of the restraint system 30 may be activated at the locking point prior to passing through the control point. In certain embodiments, the locking point may include a gate 46 (e.g., an RFID gate) positioned at the loading station 40. The gate 46 includes a transmitter 48 that transmits a wireless signal 50 to the restraint system 30. The wireless signal 50 is configured to lock or unlock the locking mechanism 36, as discussed in further detail below. In the illustrated embodiment, the gate 46 is positioned over the tracks 24. However, the gate 46 may be positioned at any other suitable location within the amusement park ride 10 that allows wireless communication between the restraint system 30 and the transmitter 48. In other embodiments, the crew member 34 may use a hand held transmitter 52 to transmit the wireless signal 50 to the locking mechanism 36, thereby locking the locking mechanism 36 and securing the rider 16 within the ride vehicle 20.

As discussed in detail below, the locking mechanism 36 may not be unlocked without receiving a lock deactivation signal transmitted after completion of the amusement park ride 10. For example, the gate 46 or the hand held transmitter 52 transmits the wireless signal 50 at the unloading station 38 after completion of the ride to deactivate the locking mechanism and release the rider 16 from the ride vehicle 20. In certain embodiments, the hand held transmitter 52 may be used to override the activation signal from the gate 46, for example, when a rider needs to unload from the ride vehicle 20 after passing through the lock point and before start of the amusement park ride 10.

Figure 2:
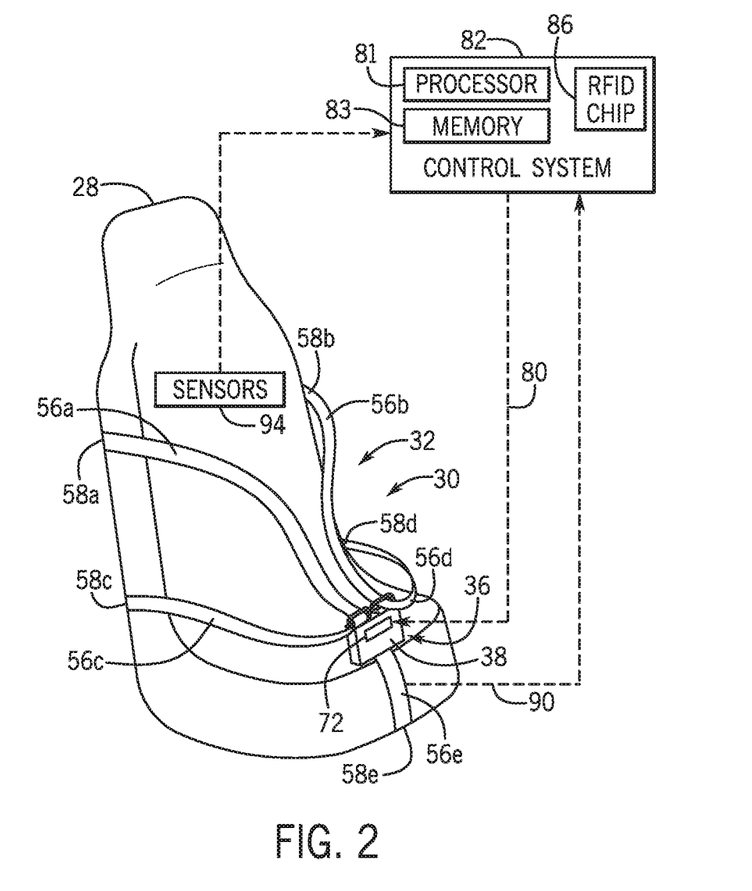
FIG. 2 is a schematic representation of the passive restraint system of FIG. 1, whereby the passive restraint system includes a five-point harness restraint in a locked configuration and having a wireless locking and unlocking mechanism, in accordance with an embodiment of the present disclosure.
Figure 3:
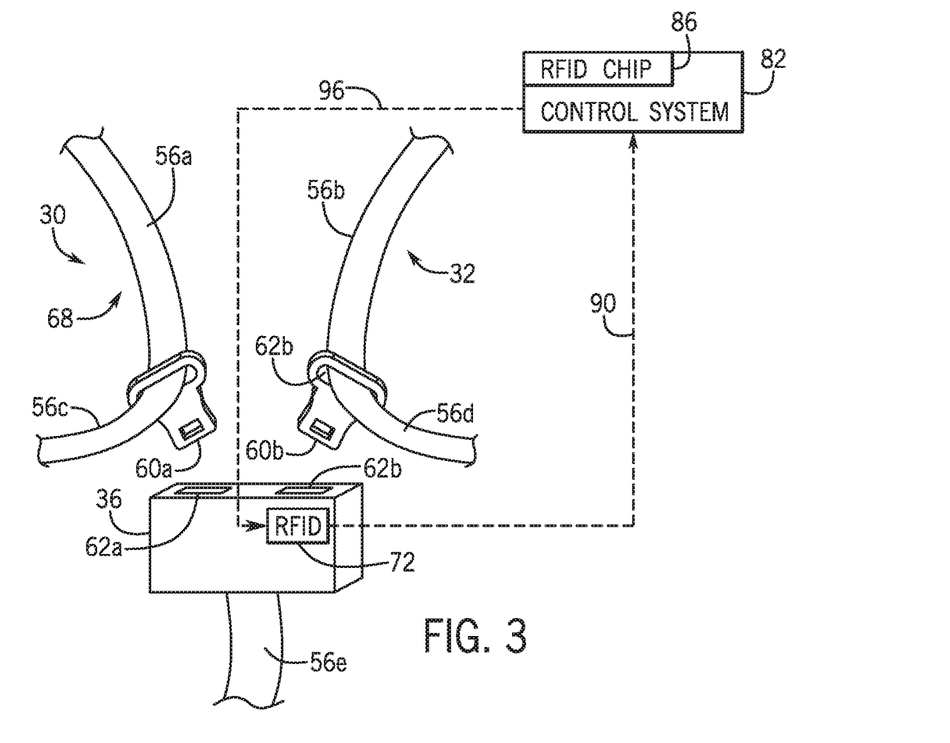
FIG. 3 is a schematic representation of the passive restraint system of FIG. 2, whereby the five-point harness restraint includes separate shoulder straps and is in an unlocked configuration, in accordance with an embodiment of the present disclosure.
Figure 4:
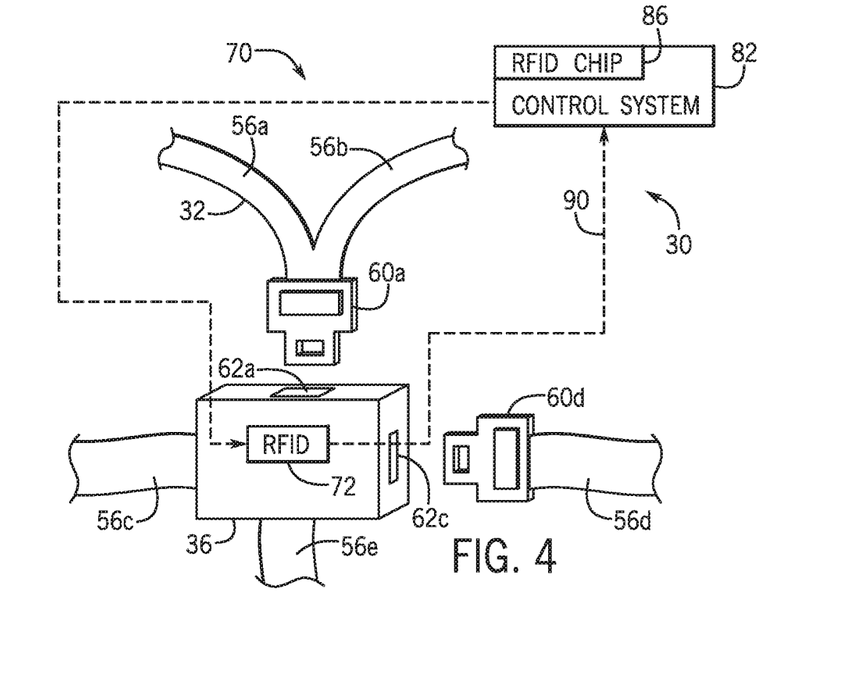
FIG. 4 is a schematic representation of the passive restraint system of FIG. 2, whereby the five point harness restraint includes adjoined shoulder straps and is in an unlocked configuration, in accordance with an embodiment of the present disclosure.

As discussed previously, the gate 40 is communicatively coupled to the locking mechanism 36 and transmits the signal 50 (e.g., an activation or deactivation signal) that locks or unlocks the restraint system 30. FIG. 2 illustrates an embodiment of the restraint system 30 in which the 5-point harness 32 is in a locked configuration. FIGS. 3 and 4 illustrates embodiments of the restraint system 30 in which the 5-point harness 32 is in the unlocked configuration. The 5-point harness 32 includes multiple straps 56 (56a, 56b, 56c, 56d, 56e) that are coupled to the rider seat 28 at five different locations. For example, the straps 56 are each coupled to a respective point 58 (58a, 58b, 58c, 58d, 58e) of the rider seat 28 that correspond to positions where the rider's shoulders, hips, and area between the legs are located when the rider 16 is properly seated in the rider seat 28. For example, the straps 56a, 56b are positioned at the point 58a, 58b corresponding to the location where the rider's shoulders would rest when seated in the rider seat 28. The straps 56c, 56d are positioned at the points 58c, 58d, respectively, corresponding to the location where the rider's hips would rest when seated in the rider seat 28. The strap 56e is positioned at the point 58e corresponding to a location between the rider's legs when the rider 16 is seated within the ride seat 28. The 5-point harness 32 may be adjustable to allow proper restraining for riders of various sizes and shapes. Certain restraining systems such as waist belts (e.g., seat belt), restraint bars (e.g., lap bars and overhead bars), and the like, may only secure a portion of the rider (e.g., only at the waist, legs, shoulders). Therefore, it may be difficult to properly secure riders of various sizes and shapes. However, the 5 point harness 32 restrains the rider 16 in a manner such that various portions of the straps 56 are in contact with various portions of the rider's upper body (e.g., shoulders, waist, and chest). In this way, the rider's upper body is completely secured within the rider seat 28. By securing the rider's upper body, the 5-point harness 32 may facilitate restraining riders of various shapes and sizes.

The straps 56 include features that facilitate coupling of one or more straps 56 to the lock 38. For example, as illustrated in the embodiments of FIGS. 3 and 4, the one or more straps 56 include a female connector 60 (60a, 60b, 60c) that is removably coupled to a male connector 62 (62a, 62b, 62c) positioned on the lock 38. In the embodiment illustrated in FIG. 3, the straps 56a, 56c and 56b, 56d are arranged such that a loop 68 (e.g., opening) is formed between the respective straps 56a, 56c and 56b, 56d. When the rider 16 is seated in the ride seat 28, the rider 16 may slip their arms into and through the loops 68 before coupling the female connector 60 to the respective male connector 62 on the lock 38. In the embodiment illustrated in FIG. 4, the straps 56a, 56b are adjoined and arranged such that a loop 70 (e.g., opening) is formed between the straps 56a, 56b. When the rider 16 is seated in the ride seat 28, the rider may slip their head into and through the loop 70 to position the straps 56a, 56b against their shoulders.

Once the straps 56 are properly positioned on the rider 16, the rider 16 may insert the female connector 60 into the respective male connector 62 to removably couple the straps 56 to the lock 38. Following coupling of the straps 56 to the lock 38 (e.g., via the connectors 60, 62), the locking mechanism 36 may be activated to secure the rider 16 within the ride vehicle 20. In certain embodiments, the locking mechanism 36 includes a radio frequency identification (RFID) feature 72 that may function as an electronic key to lock and unlock the locking mechanism 36. For example, as illustrated in FIG. 2, the RFID feature 72 may be a receiver that receives an activation signal 80 from a control system 82 prior to the start of the amusement park ride 10 (e.g., before movement of the ride vehicle 20 along the tracks 24). The control system 82 may be part of a main control system of the amusement park ride 10 or a separate control system integrated into, for example, the gate 46. The control system 82 may detect that a rider 16 is occupying the ride seat 28 and, in response, transmit the activation signal 80 to the RFID feature 72. For example, once the control system 82 identifies that the rider 16 is occupying the ride seat 28, the control system 82 may transmit the activation signal 82 once the ride vehicle approaches the lock point at the loading station 38. In certain embodiments, the crew member 34 may actuate the locking mechanism using the hand held device 52.

The control system 82 may include a processor 81, which may include one or more processing devices, and a memory 83 storing instructions executable by the processor 81. The memory 83 may include one or more tangible, non-transitory, machine-readable media. By way of example, such machine-readable media can include RAM, ROM, EPROM, EEPROM, optical disk storage, magnetic disk storage or other magnetic storage devices, or any other medium which can be used to carry or store desired program code in the form of machine-executable instructions or data structures and which can be accessed by the processor 81 or by any general purpose or special purpose computer or other machine with a processor. The control system 82 may also include communications circuitry and/or input and output circuitry to facilitate communication with other components of the amusement park ride 10. In addition, the control system 82 may be coupled, either directly or wirelessly, to an operator input device or operator interface that, in operation, may be used by a ride technician to provide input used to control one or more ride features. The operator interface, or other components of the ride 10, may be located remotely from the control system 82 in certain embodiments and may be, for example, implemented on a mobile device.

The control system 82 may also have a radio frequency (RF) chip 86 that detects the RFID feature 72 and transmits the activation signal 80 to the locking mechanism 36. For example, the RFID feature 72 may transmit a signal 90 that is detected by the RF chip 86. In response to the signal 90, the control system 82 outputs the activation signal 80 to activate the locking mechanism 36. Upon receiving the activation signal 80, the locking mechanism 36 may actuate a locking pin or other suitable locking mechanism within the lock 38, which secures and blocks movement of the female connectors 60 out of the respective male connectors 62 in the lock 38. By blocking movement of the female connectors 60, the rider 16 may be unable to prematurely unlock the locking mechanism 36 while the ride vehicle 20 is in motion. While in the illustrated embodiment the RFID feature 72 is shown as being part of the lock 38, in other embodiments the RFID feature 72 is part of the female connectors 60. Further, the RF chip 86 in the control system 82 may, at the lock point, emit a blanket locking signal to all ride vehicles 20 in-range. In other embodiments, the RF chip 86 may emit the locking signal after a handshake communication (e.g., detection) of each rider 16 restrained within the ride vehicle 20.

In certain embodiments, the ride seat 28 may include a sensor 94 that determines whether the restraint system 30 of each ride seat 28 is in the restrained or unrestrained configuration. For example, when the restraint system 30 is in the unrestrained configuration, the sensor 94 may transmit a signal to the control system (e.g., the control system 82) indicating that the restraint system 30 is in the unrestrained configuration. The control system may block release of the ride vehicle 20 from the lock point and or the control point until the restraint system 30 is in the restrained configuration. As such, the crew member 34 may need to verify that the ride seat 28 is vacant, manually couple the female connectors 60 to the male connectors 62, and activate the locking mechanism using the hand held device 52. The control system may then determine that all restraint systems 30 in the ride vehicle 20 are secured and release the ride vehicle 20. In the illustrated embodiment the sensor 94 is positioned on a back rest of the ride seat 28. However, the sensor 94 may be positioned at any other location on the ride seat 28 or the ride vehicle 20 that facilitates communication with the restraint system 30 and/or the control system 82.

In other embodiments, the sensor 94 may transmit a signal indicative of an unoccupied ride seat 28. Upon detection of the signal from the sensor 94, the control system may determine that the ride seat 28 is unoccupied and allow release of the ride vehicle from the control point with the restraint system 30 corresponding to the unoccupied seat 28 being in the unrestrained configuration. For example, in certain embodiments, the sensor 94 may receive a signal from retro-reflective markers positioned on the ride seat 28. The retro-reflective markers may reflect light that is detected by the sensor 94. Based on the intensity of the reflected light or the degree of attenuation of the reflected light detected by the sensor 94, the control system 82 may determine whether the ride seat 28 is occupied or unoccupied. For example, when the rider 16 is positioned within the ride seat 28, the rider 16 may block at least a portion of the retro-reflective markers. As such, the light reflected by the retro-reflective markers may be attenuated. However, when the ride seat 28 is unoccupied, the retro-reflective markers are not blocked and the intensity of the light reflected by the retro-reflective markers would be greater than the intensity of light reflected with the ride seat is occupied. Accordingly, the control system 82 may determine that the ride seat is unoccupied.

In other embodiments, the sensor 94 may be a pressure sensor disposed on the ride seat 28. For example, the sensor 94 may be disposed on a back rest or seat cushion of the ride seat 28. The pressure sensor may transmit a signal to the control system 82 indicative of a pressure exerted on the ride seat 28. If the pressure signal is less than a predetermined value (e.g., less than approximately 5 pounds per square inch), the control system 82 may determine that the ride seat is unoccupied. As such, the control system 82 may release the ride vehicle 20 from the control point with the restraint system 30 corresponding to the unoccupied ride seat 28 in the unrestrained configuration.

After completion of the amusement park ride 10, the restraint system 30 may be unlocked. For example, once the ride 10 is complete and the ride vehicle 20 is at a complete stop in the unloading station 40, the RFID feature 72 may receive a deactivation signal 96 emitted by the gate 46 and/or the control system 82 of the amusement park ride 10. For example, similar to activation, the RFID chip 86 detects the RFID feature 72 (e.g., signal 90) when the ride vehicle 20 is at the unloading station 38. Once the ride vehicle 20 reaches the unlock point, the gate 46 and/or the control system 82 transmits the deactivation signal 96 to the RFID feature 72. In response to the deactivation signal 96, the locking mechanism 36 may unlock the lock 38 to allow the rider 16 to uncouple the female connector 60 from the male connector 62 and exit the ride vehicle 20.

In certain embodiments, the crew member 34 may deactivate the locking mechanism 36 of the restraint system 30 using the hand held transmitter 52, a key card, or other electronic key. By deactivating the locking mechanism 36 of the restraint system 30 via the wireless signal, premature unlocking of the lock 38 may be mitigated. Additionally, a power source used to actuate power controlled restraint systems may not need to be integrated into the ride vehicle 20. Accordingly, existing amusement park rides that do not include a power source may be retrofit with the restraint system 30, thereby decreasing the cost associated with implementing a power source into the amusement park ride and improving the restraint system to better secure and retain a rider within the ride seat throughout the duration of the amusement park ride. The 5-point harness restraint system disclosed herein may also facilitate securing riders of various shapes and sized by restraining the rider at various points along the rider's body (e.g., shoulders, waist, and chest).

Figure 5:
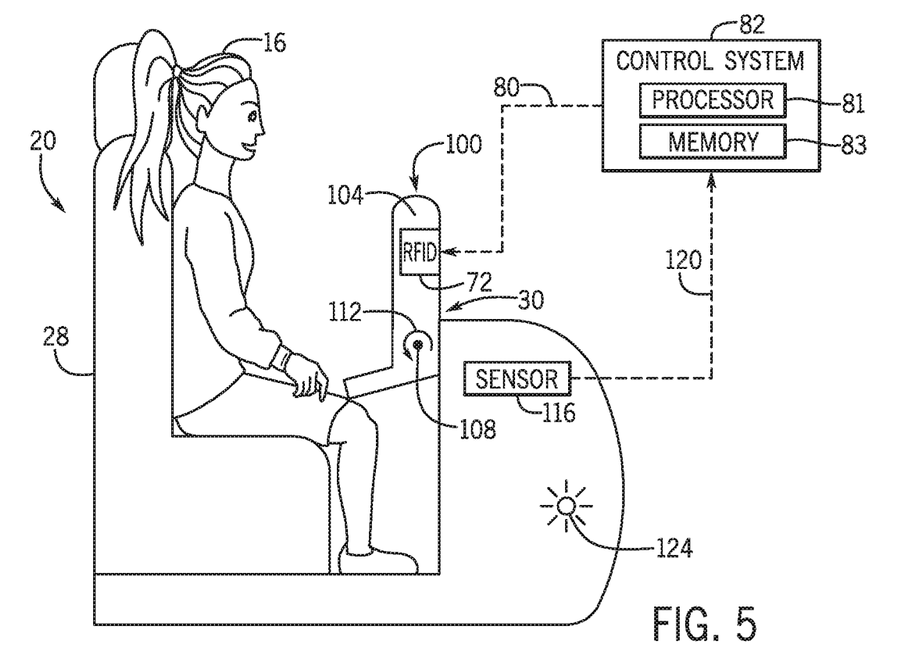
FIG. 5 is a schematic representation of a passive restraint system that may be used with the amusement park ride of FIG. 1, whereby the passive restraint system includes a restraint bar having a pivotable arm in an unlocked configuration and having a wireless locking and unlocking mechanism, in accordance with an embodiment of the present disclosure.
Figure 6:
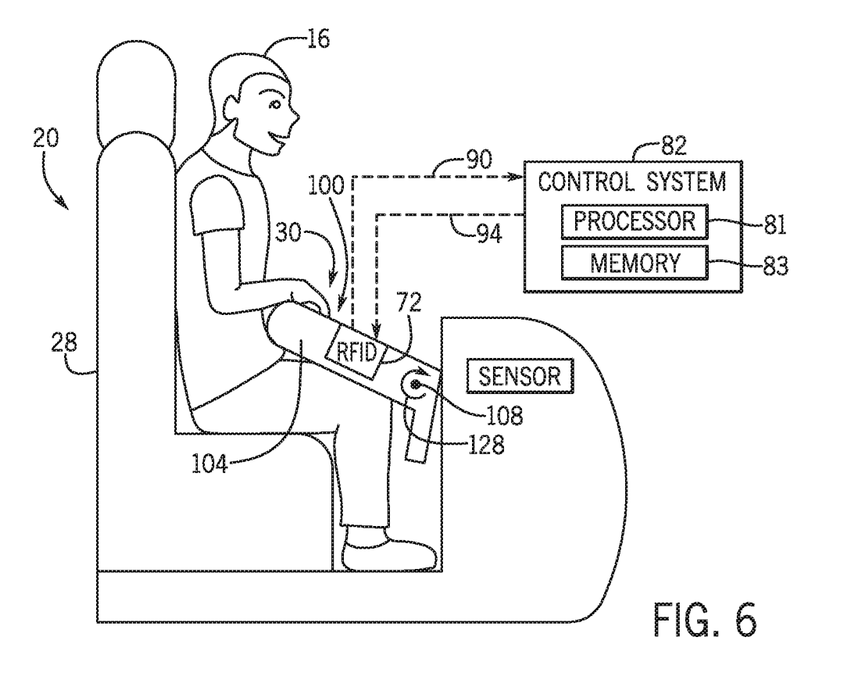
FIG. 6 is a schematic representation of the passive restraint system of FIG. 5, whereby the restraint bar is in a locked configuration, in accordance with an embodiment of the present disclosure.

The locking mechanism 36 may also be incorporated into other type of restraining systems that do not include the 5-point harness 32. For example, the locking mechanism may be incorporated into a seat belt, a restraint bar (e.g., lap bar or an overhead bar) or any other suitable restraint system used to secure a rider within a ride seat of an amusement park ride. FIG. 5 is a side-view of an embodiment of the restraint system 30 having a restraint bar 100 in the unrestrained configuration that is used to restrain and secure the rider 16 within the ride vehicle 20. FIG. 6 is a side-view of the restraint bar 100 in the restrained configuration.

The restraint bar 100 includes a pivoting arm 104 that rotates about an axis 108 to move the restraint bar 100 between the restrained (FIG. 6) and unrestrained (FIG. 5) configurations. As discussed above, the restraint system 30 includes a locking mechanism that is activated and deactivated by a wireless signal. Accordingly, in the illustrated embodiment, the restraint bar 100 includes the RFID feature 72 positioned within the pivoting arm 104. The RFID feature 72 transmits the signal 90 to the control system 82, signaling the control system 82 to transmit the activation signal 80. Upon receiving the activation signal 80 from the control system 82, the pivoting arm 104 rotates about the axis 108, as shown by arrow 112, to move the restraint bar 100 from the unrestrained configuration to the restrained configuration. For example, the pivoting arm 104 rotates toward the rider 16 in the direction 112 to position the restraint bar 100 in the restrained configuration.

In certain embodiments, the ride vehicle 20 may include one or more sensors 116 communicatively coupled to the control system 82 of the amusement park ride 10. The one or more sensors 116 may transmit a signal 120 to the control system 82 indicating that the ride seat 28 is occupied and that the rider 16 may need to be secured within the ride seat 28. For example, near-field communications may be utilized to determine that the rider 16 is seated in the ride seat 28. In response to such a determination, the control system 82 transmits the activation signal 80 causing the pivoting arm 104 to move toward the rider 16 in the direction 108. Once the pivoting arm 104 is in the restrained configuration, the pivoting arm 104 locks to block rotation of the pivoting arm 104 and securing the rider 16 within the ride seat 28. In certain embodiments, the crew member 34 may activate the pivoting arm 104 with the hand held transmitter 52. The control system 82 may activate a light 124 on the ride vehicle 20 to indicate that the rider 16 is secured and the ride vehicle 20 is released from the loading station 40.

Upon completion of the amusement park ride 10, the pivoting arm 104 may be unlocked to enable rotation of the pivoting arm 104 in a direction 128 away from the rider 16, as shown in FIG. 6. For example, as discussed above, the RFID feature 72 receives the deactivation signal 94 from the control system 82 of the amusement park ride 10. In other embodiments, the gate 46 or the crew member 34 (e.g., via the hand held transmitter 52) may transmit the deactivation signal 96. In response to the deactivation signal 96, the pivoting arm 104 rotates in the direction 128 about the axis 108 to move the restraint bar 100 from the restrained configuration of the unrestrained configuration. As such, the rider 16 may be unrestrained and exits the ride vehicle 20 at the unloading station 40.

Traditional systems and methods for activating restraint systems on amusement park rides use a power source that is integrated into the ride vehicle. However, it is now recognized that by using electromagnetic signals to activate and deactivate a locking mechanism of restraint systems, a power source may not need to be integrated into the ride vehicle. As such, costs associated with integrating a power source into existing and/or new ride vehicles may be decreased compared to ride vehicles that include a power source for the restraint system. Additionally, by using electromagnetic signals to activate and deactivate restraint locking mechanisms, premature unlocking of the restraint system may be mitigated and restraint design may be improved to secure riders of various sizes and shapes.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
  a ride vehicle of an amusement park ride;
  a restraint system coupled to the ride vehicle and comprising a lock having a detector configured to receive a locking signal or an unlocking signal, wherein the locking signal and the unlocking signal are wireless signals, wherein receiving the locking signal or the unlocking signal causes the lock to transition between a locked configuration and an unlocked configuration, wherein the restraint system is configured to secure a rider within the ride vehicle in the locked configuration, and wherein the restraint system is configured to release the rider in the unlocked configuration;
  a lock control point comprising a first transmitter configured to transmit the locking signal to cause the lock of the restraint system to transition to the locked configuration, wherein the lock control point is located at a load zone for the ride vehicle; and
  an unlock control point comprising a second transmitter configured to transmit the unlocking signal to cause the lock of the restraint system to transition to the unlocked configuration.

2. The system of claim 1, wherein the first transmitter and the second transmitter are radio frequency (RF) chips configured to transmit the locking signal and the unlocking signal, and wherein the detector is a radio frequency identification (RFID) tag.

3. The system of claim 1, wherein the restraint system comprises a five-point harness having a plurality of straps each having at least one end fixedly coupled to a ride seat of the ride vehicle, wherein at least one strap of the plurality of straps comprises a connector and at least one other strap of the plurality of straps comprises the lock on a free end, wherein the connector is configured to be removably coupled to the lock to secure the rider within the ride vehicle when the lock is in the locked configuration.

4. The system of claim 1, wherein the detector is positioned within the lock and comprises a radio frequency identification (RFID) tag.

5. The system of claim 1, wherein the restraint system comprises a pivoting arm configured to rotate about an axis to move the pivoting arm between a restrained configuration and an unrestrained configuration, wherein the detector is disposed on the pivoting arm and comprises a radio frequency identification (RFID) tag, and wherein receiving the locking signal or the unlocking signal causes the pivoting arm to lock or unlock, wherein the pivoting arm is capable of pivoting in the unlocked configuration to transition from the restrained configuration to the unrestrained configuration and wherein the pivoting arm is fixed in the restrained configuration when the lock is in the locked configuration.

6. The system of claim 1, comprising one or more sensors configured to detect the rider within a seat of the ride vehicle.

7. A system, comprising:
  a restraint system coupled to a ride vehicle of an amusement park ride and configured to secure a rider within the ride vehicle, wherein the restraint system comprises:
    a first strap comprising a first connector;
    a second strap comprising a second connector;
    a third strap comprising a lock configured to removably couple to the first connector and the second connector; and
    a detector configured to receive a locking signal or an unlocking signal, wherein the locking signal and the unlocking signal are wireless signals, wherein receiving the locking signal or the unlocking signal causes the lock to transition between a locked configuration and an unlocked configuration, wherein the first connector and the second connector are at least partially retained within the lock in the locked configuration and are removable from the lock in the unlocked configuration;
  a lock control point comprising a first transmitter configured to transmit the locking signal to cause the lock of the restraint system to transition to the locked configuration, wherein the lock control point is located at a load zone for the ride vehicle; and
  an unlock control point comprising a second transmitter configured to transmit the unlocking signal to cause the lock of the restraint system to transition to the unlocked configuration.

8. The system of claim 7, wherein the first transmitter and the second transmitter are radio frequency (RF) chips configured to transmit the locking signal and the unlocking signal, respectively, and wherein the detector is a radio frequency identification (RFID) tag.

9. The system of claim 7, wherein the first strap and the second strap each comprise a first end and a second end coupled to a ride seat of the ride vehicle such that a loop is formed between the first and second ends of each respective strap, and wherein the loop is configured to receive an arm of the rider.

10. The system of claim 9, wherein the first connector and the second connector are positioned between the first and second ends of the respective strap.

11. The system of claim 7, wherein the first strap comprises a first fixed end and a first free end and the second strap comprises a second fixed end and a second free end, wherein the first free end and the second free end comprise the first and second connectors, respectively, and wherein the first fixed end and the second fixed end are each coupled to a ride seat of the ride vehicle.

12. The system of claim 7, wherein the ride vehicle is configured to receive power from an external or internal power source to power operations of the ride vehicle, and wherein the lock is configured to maintain the locked configuration when not receiving power from the power source.

13. The system of claim 12, wherein the lock is configured to transition to the unlocked configuration when the external or internal power source is not active or not supplying power to the restraint system.

14. The system of claim 7, wherein the locking signal, the unlocking signal, or both are encrypted.

15. A system, comprising:
a ride vehicle of an amusement park ride; and
a restraint system coupled to the ride vehicle, wherein the restraint system comprises:
  a restraining bar comprising a pivoting arm configured to rotate about an axis to move the pivoting arm between a restrained configuration and an unrestrained configuration, wherein the restraint system is configured to secure a rider within the ride vehicle in the restrained configuration, and wherein the restraint system is configured to release the rider in the unrestrained configuration; and
  a detector disposed on the pivoting arm and comprising a radio frequency identification (RFID) tag, wherein the detector is configured to receive one or more wireless signals, wherein receiving the one or more wireless signals causes the pivoting arm to lock or unlock, wherein the pivoting arm is configured to pivot when unlocked to transition from the restrained configuration to the unrestrained configuration, and wherein the pivoting arm is fixed in the restrained configuration when locked.

16. The system of claim 15, comprising:
a lock control point comprising a first transmitter configured to transmit a first wireless signal of the one or more wireless signals to cause the pivoting arm of the restraint system to lock, wherein the lock control point is located at a load zone for the ride vehicle; and
an unlock control point comprising a second transmitter configured to transmit a second wireless signal of the one or more wireless signals to unlock the pivoting arm of the restraint system.

17. The system of claim 16, wherein the first and second transmitters are radio frequency (RF) chips configured to transmit the first wireless signal and the second wireless signal.

18. The system of claim 15, comprising a portable transmitter configured to transmit the one or more wireless signals.

19. The system of claim 15, comprising one or more sensors configured to detect the rider within a seat of the ride vehicle.

20. The system of claim 19, comprising a control system configured to transmit the one or more wireless signals to the detector in response to receiving a signal from the one or more sensors indicative of the rider occupying the seat of the ride vehicle.

* * * * *